United States Patent
Jiang

(10) Patent No.: US 8,665,740 B2
(45) Date of Patent: Mar. 4, 2014

(54) METHOD AND DEVICES FOR BIT RATE ALLOCATION FOR POINT-TO-MULTIPOINT MULTIMEDIA COMMUNICATIONS

(75) Inventor: Feng Jiang, Changsha (CN)

(73) Assignee: Nokia Siemens Networks Oy, Espoo (FI)

( * ) Notice: Subject to any disclaimer, the term of this patent is extended or adjusted under 35 U.S.C. 154(b) by 411 days.

(21) Appl. No.: 13/057,214

(22) PCT Filed: Jul. 28, 2009

(86) PCT No.: PCT/EP2009/059718
§ 371 (c)(1),
(2), (4) Date: Feb. 2, 2011

(87) PCT Pub. No.: WO2010/015546
PCT Pub. Date: Feb. 11, 2010

(65) Prior Publication Data
US 2011/0134790 A1 Jun. 9, 2011

(30) Foreign Application Priority Data
Aug. 6, 2008 (EP) ...................................... 08161898

(51) Int. Cl.
*H04L 12/18* (2006.01)

(52) U.S. Cl.
USPC ........... 370/252; 370/329; 370/332; 370/240; 370/338; 455/226.3; 455/101; 375/222; 375/296

(58) Field of Classification Search
USPC .............. 370/332, 352, 538, 329, 338, 468; 375/130, 240.26, 242, 240.02, 148; 455/226.3, 101–102, 466
See application file for complete search history.

(56) References Cited

U.S. PATENT DOCUMENTS

| 7,072,366 | B2 * | 7/2006 | Parkkinen et al. | 370/538 |
|---|---|---|---|---|
| 8,433,258 | B2 * | 4/2013 | Luo et al. | 455/101 |
| 2004/0038658 | A1 * | 2/2004 | Gurelli et al. | 455/226.3 |
| 2004/0213182 | A1 * | 10/2004 | Huh et al. | 370/332 |
| 2006/0104370 | A1 * | 5/2006 | Yamanaka et al. | 375/242 |
| 2009/0219990 | A1 * | 9/2009 | Han et al. | 375/240.02 |

FOREIGN PATENT DOCUMENTS

WO    2008/079222    7/2008

OTHER PUBLICATIONS

Wei-Ying Kung et al., Packet video transmission over wireless channels with adaptive channel rate allocation, Journal of Visual Communication & Image Representation, vol. 16, Aug. 2005, pp. 475-498.
Mehdi Alasti et al., Multiple Description Coding in Networks with Congestion Problem, IEEE Transactions on Information Theory, vol. 47, No. 3, Mar. 2001, pp. 891-902.

(Continued)

*Primary Examiner* — Charles C Jiang
*Assistant Examiner* — Mohamed Kamara
(74) *Attorney, Agent, or Firm* — Squire Sanders (US) LLP

(57) ABSTRACT

A method is provided for controlling point-to-multipoint communications. Channel condition information for multiple receivers of a point-to-multipoint group is received. Signal-to-noise ratio distortion is estimated for a point-to-multipoint group on the basis of the received channel condition information and available encoding bit rates. A bit rate allocation providing an optimal overall signal-to-noise ratio for transmission to the point-to-multipoint group is selected. Encoding of content to the point-to-multipoint group is controlled in accordance with the selected bit rate allocation.

13 Claims, 2 Drawing Sheets

(56) References Cited

OTHER PUBLICATIONS

Ningning Hu et al., Estimating Available Bandwidth Using Packet Pair Probing, CMU-CS-02-166, Sep. 9, 2002, a total of 27 pages.

3rd Generation Partnership Project; Technical Specification Group Services and System Aspects; Multimedia Broadcast/Multicast Service (MBMS); Architecture and functional description (Release 8), 3GPP TS 23.246 V8.2.0, 2008, a total of 57 pages.

3rd Generation Partnership Project; Technical Specification Group Services and System Aspects; Multimedia Broadcast/Multicast Service (MBMS); Protocols and codecs (Release 7), 3GPP TS 26.346 V7.8.0, 2008, a total of 132 pages.

C. Groves et al., Gateway Control Protocol Version 1, Network Working Group, RFC: 3525, Jun. 2003, a total of 213 pages.

* cited by examiner

METHOD AND DEVICES FOR BIT RATE ALLOCATION FOR POINT-TO-MULTIPOINT MULTIMEDIA COMMUNICATIONS

FIELD

The invention relates to bit rate allocation in a point-to-multipoint multimedia communications system.

BACKGROUND

Various techniques exist to arrange substantially simultaneous transmission of multimedia content to a plurality of receivers. Aiming at various one-to-many communication scenarios, multicast is a technology to deliver information to a group of users simultaneously, with a unique efficiency advantage because it creates copies of information only when users' routes split. Multicast is widely used for delivering multimedia contents over packet networks, such as video broadcasting and network conference. Multicast has become an essential building block of Internet Protocol version 6 (IPv6).

Depending on network conditions and local computing resources, mobile terminals of a multicast system may have limited capacity in receiving and playing full-quality multimedia contents, leading to inferior playback quality and degraded user experience. For example, a 256 Kbps IPTV livecast may overrun a general packet radio service (GPRS) network, and another 128 Kbps Moving Picture Experts Group (MPEG) 4 movie may simply exceed the computing capacity of most mobile devices.

Therefore, multimedia contents need to be tailored before being delivered via the network. Resolution downsizing, frame dropping, encoding type conversion or their combinations are known techniques for this purpose. As an important approach to this problem, to make efficient use of network and terminal capacities, scalable encoding may be used. A multimedia stream may be divided into multiple sub-streams, namely descriptions. Each description can be further divided into a base layer (BL) and an enhancement layer (EL). Information on subscribers' available bandwidth in a multicast session is required when determining bit rate allocation for each layer. However, in actual application environments, the available bandwidth, on which a layered encoding depends on, cannot be accurately and reliably derived from prior knowledge since the available bandwidth is affected by many dynamic factors, such as network congestion.

Bit allocation schemes with awareness of user bandwidth have been developed, but these schemes are optimized for a single user. However, in a typical multicast system, overall video quality of a group of users should be optimized. A transcoder should be able to encode a video stream to meet the requirements of the entire group of users, each of which may have very different capacities.

BRIEF DESCRIPTION

According to an aspect of the present invention, there is provided a method, an apparatus, a system, and a computer program product as specified in the independent claims. Some embodiments of the invention are specified in the dependent claims.

According to an aspect, there is provided a method comprising: receiving channel condition information for multiple receivers of a point-to-multipoint group, estimating signal-to-noise ratio distortion for the point-to-multipoint group on the basis of the received channel condition information and available encoding bit rates, selecting a bit rate allocation out of the available encoding bit rates providing an optimal overall signal-to-noise ratio for transmission to the point-to-multipoint group, and controlling encoding of content to the point-to-multipoint group in accordance with the selected bit rate allocation.

According to an aspect, there is provided an apparatus comprising: means for receiving channel condition information for multiple receivers of a point-to-multipoint group, means for estimating signal-to-noise ratio distortion for the point-to-multipoint group on the basis of the received channel condition information and available encoding bit rates, means for selecting a bit rate allocation out of the available encoding bit rates providing an optimal overall signal-to-noise ratio for transmission to the point-to-multipoint group, and means for controlling encoding of content to the point-to-multipoint group in accordance with the selected bit rate allocation.

The invention and various embodiments of the invention provide several advantages which will become apparent from the detailed description below. One advantage is that the overall signal-to-noise ratio of a point-to-multipoint group may be optimized and an optimal bit rate allocated for transmission to the point-to-multipoint group.

LIST OF DRAWINGS

Embodiments of the present invention are described below by way of example only and with reference to the accompanying drawings, in which FIG. 1 illustrates a multicast communications system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
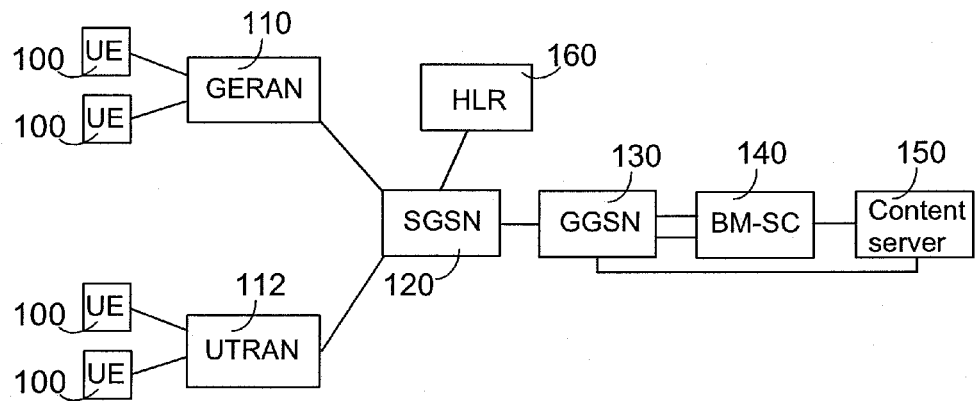

Specific network entities and interfaces have been developed to manage point-to-multipoint (PTM) transmission, such as multicast or broadcast. For example, in Third Generation Partnership Project (3GPP), multimedia broadcast/multicast service (MBMS), specified in 3GPP specifications TS 23.246 (stage 2) and TS 26.346 (stage 3), is proposed as a sub-system for provisioning multimedia content in global system for mobile Communications (GSM) and universal mobile telecommunications system (UMTS) cellular networks. FIG. 1 illustrates the general architecture of a 3GPP communications system provided with MBMS.

A group of MBMS subscribers, represented by user equipment (UE) 100, may access the MBMS via a GSM/EDGE radio access network (GERAN) 110 or a UMTS terrestrial radio access network (UTRAN) 112. However, application of the present point-to-multipoint control related features is not limited to the use of any specific standard/non-standard access communication means. Although GERAN 110 and UTRAN 112 are illustrated in FIG. 1, other current or future access networks may be used to access MBMS, such as a wireless local area network (WLAN). For instance, MBMS may be provided by an evolved BM-SC (eBM-SC) via an evolved packet system (EPS) and evolved UTRAN (E-UTRAN).

The access network 110, 112 is connected to a core network, and for packet-switched services to a serving GPRS support node (SGSN) 120. The SGSN 120 is further connected to a home location register (HLR) 160 and a gateway GPRS support node (GGSN) 130. The GGSN 130 is connected to a broadcast multicast service center (BM-SC) 140 providing the MBMS.

BM-SC 140 provides functions for MBMS user service provisioning and delivery. BM-SC 140 receives content from a content server 150 and controls the transmission of the content in a form suitable for multicast or broadcast to a multicast or broadcast group of a plurality of user equipment 100 using a multicast mode or a broadcast mode, respectively. The broadcast mode differs from the multicast mode in that there is no specific requirement to activate or subscribe to MBMS in broadcast mode.

The content server 150 may be part of or connected to the 3GPP infrastructure, or transmit content for BM-SC 140 via one or more intermediate networks. BM-SC 140 advertises multimedia content meta information, such as a codec type and video resolution, allowing the participating clients to decide whether to subscribe according to their own networking and computing resources. A download delivery method and streaming delivery method are available for delivering multimedia content over MBMS bearers. Further details on MBMS are available in the 3GPP specifications TS 23.246 (e.g. version 8.2.0 2008-06) and TS 26.346 (e.g. version 7.8.0 2008-06).

FIG. 1 is a simplified system architecture that only shows some elements and functional entities, all being logical units whose implementation may differ from what is shown. It is apparent to a person skilled in the art that the systems also comprise other functions and structures. It should be appreciated that the functions, structures, elements and the protocols used in or for transmitting the encoded multimedia content from BM-SC 140 to the multiple UE 100 of the group are irrelevant to the present bit rate allocation method. Therefore, they need not to be discussed in more detail here.

However, the application of embodiments is not limited to the 3GPP MBMS system or any other specific PTM system, but present features may be applied generally in a communications system enabling PTM transmission of content to a plurality of receivers over an access network. The communications system may be a fixed communications system or a wireless communications system or a communications system utilizing both fixed networks and wireless networks. The protocols used and the specifications of communications devices, especially in wireless communication, develop rapidly. Such development may require extra changes to an embodiment. Therefore, all words and expressions in the present embodiments should be interpreted broadly and they are intended to illustrate, not to restrict, the embodiments.

A multimedia stream for PTM transmission may be divided into multiple sub-streams, namely descriptions, to accommodate various transmitting, computing and storage requirements. Each description can be further divided into a base layer (BL) and an enhancement layer (EL). Although EL is decodable only if its respective BL is correctly received and decoded, there is no such dependency between multiple descriptions of a stream. On subscribers' 100 side, playback quality, usually measured by signal-to-noise ratio (SNR), is seriously impacted by how much data bits are encoded into each layer and whether a layer is successfully received. In literature, a term peak signal-to-noise ratio (PSNR) is used in substitution of SNR. The term "signal-to-noise ratio/SNR" is to be understood broadly in the present context to also encompass the use of PSNR.

Simple layered encoding depends on prior knowledge on subscribers' available bandwidth in a PTM session to decide which bit rate shall be allocated to each layer. For example, for a 128 Kbps video subscribers of the session having 40 Kbps, 80 Kbps and 160 Kbps bandwidth available for receiving this video, a transcoder encodes BL in 32 Kbps, first EL in 32 Kbps and second EL in 64 Kbps, depending on the available output bit rate of codecs.

In the present embodiment, a model is provided to estimate SNR of a PTM group in lossy channels. Overall SNR may be improved by using this model to determine and select optimal bit rates. The determining process can be performed once at the PTM session initialization stage, triggered by a specific event, or dynamically adjusted at given intervals during the runtime.

Figure 2:
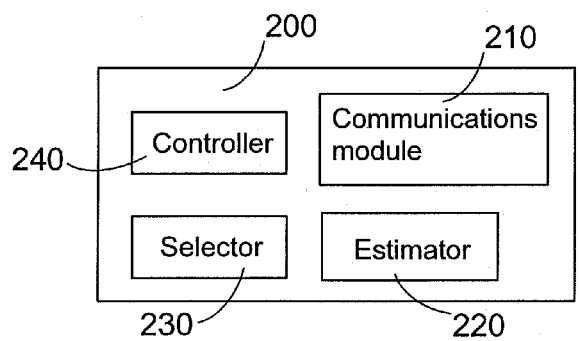
FIG. 2 illustrates an apparatus according to an embodiment.

FIG. 2 is a block diagram illustrating features of an apparatus 200 according to an embodiment of the invention. Although the apparatus 200 has been depicted as one entity, different modules and memory may be implemented in one or more physical or logical entities.

The apparatus 200 comprises a communications unit for obtaining channel condition information for multiple receivers of a PTM group, and an estimator 220 connected to the communications unit 210, for generating a signal-to-noise ratio distortion estimation for the PTM group on the basis of the received channel condition information and available encoding bit rates.

Further, the apparatus 200 comprises a selector 230 connected to the estimator 220 for selecting a bit rate allocation providing an optimal signal-to-noise ratio for transmission to the PTM group. The apparatus 200 also comprises a controller 240 connected to the selector 230 for controlling encoding of content to the PTM group in accordance with the selected bit rate allocation. The communications unit 210 may be configured to send different outputs, information and messages, such as a control signal to an encoder from the controller 240, or there may be a separate sender unit for this purpose.

It is to be noted that the units of FIG. 2 are illustrative and more or fewer units may be used to provide the present PTM control related features. For instance, the apparatus 200 may comprise a rate-distortion analyser unit configured to provide the features of the units 210 to 240, as illustrated later in connection with FIGS. 3 and 4. The apparatus 200 may comprise various further features. For instance, in one embodiment the apparatus 200 comprises a transcoder that the controller 240 controls, instead of controlling a transcoder external to the apparatus 200.

The functionality of the apparatus 200 is described in more detail below with FIGS. 3 to 4. It should be appreciated that the apparatus may comprise other units used in or for other features. However, they are irrelevant to the actual invention and, therefore, they need not to be discussed in more detail here.

The apparatus 200 may be any node, server, or host which is able to analyze channel condition information and control PTM transmission data rates on the basis of a signal-to-noise ratio distortion estimation calculated on the basis of the received channel condition information and available encoding bit rates. Some further embodiments of such an apparatus 200 are disclosed below.

In one embodiment the apparatus 200 is a device configured to function as BM-SC 140 of a 3GPP MBMS system and/or Media Resource Function Controller (MRFC) of a 3GPP IP Multimedia System (IMS). However, the implementation of the apparatus 200 is not limited to any particular standardized network element, but may be implemented generally as a multimedia PTM control unit or a multimedia processing unit (MPU).

The apparatus 200 thus comprises not only prior art means, but also means for implementing some or all of the features related to controlling PTM transmission bit rate allocation, as illustrated further in detail below. The apparatus may comprise separate means for each separate function, or means may be configured to perform two or more functions.

Present communications apparatuses comprise processors and memory that can be utilized in an embodiment. For example, the units 220, 230, 240 may be provided by a software application, a module, or a unit configured as arithmetic operation, or as a program (including an added or updated software routine) executed by an operation processor. Programs, also called program products, including software routines, applets, and macros, can be stored in any computer readable data storage medium and they include program instructions to perform particular tasks. All modifications and configurations required for implementing the functionality of an embodiment may be performed as routines which may be implemented as added or updated software routines, application circuits (ASIC) and/or programmable circuits. Further, software routines may be downloaded into an apparatus.

The apparatus, such as a server or a corresponding server component, may be configured as a computer or a microprocessor, such as a single-chip computer element, including at least a memory for providing storage area used for arithmetic operation and an operation processor for executing the arithmetic operation. One example of the operation processor is a central processing unit. The memory may be a removable memory detachably connected to the apparatus.

Figure 3:
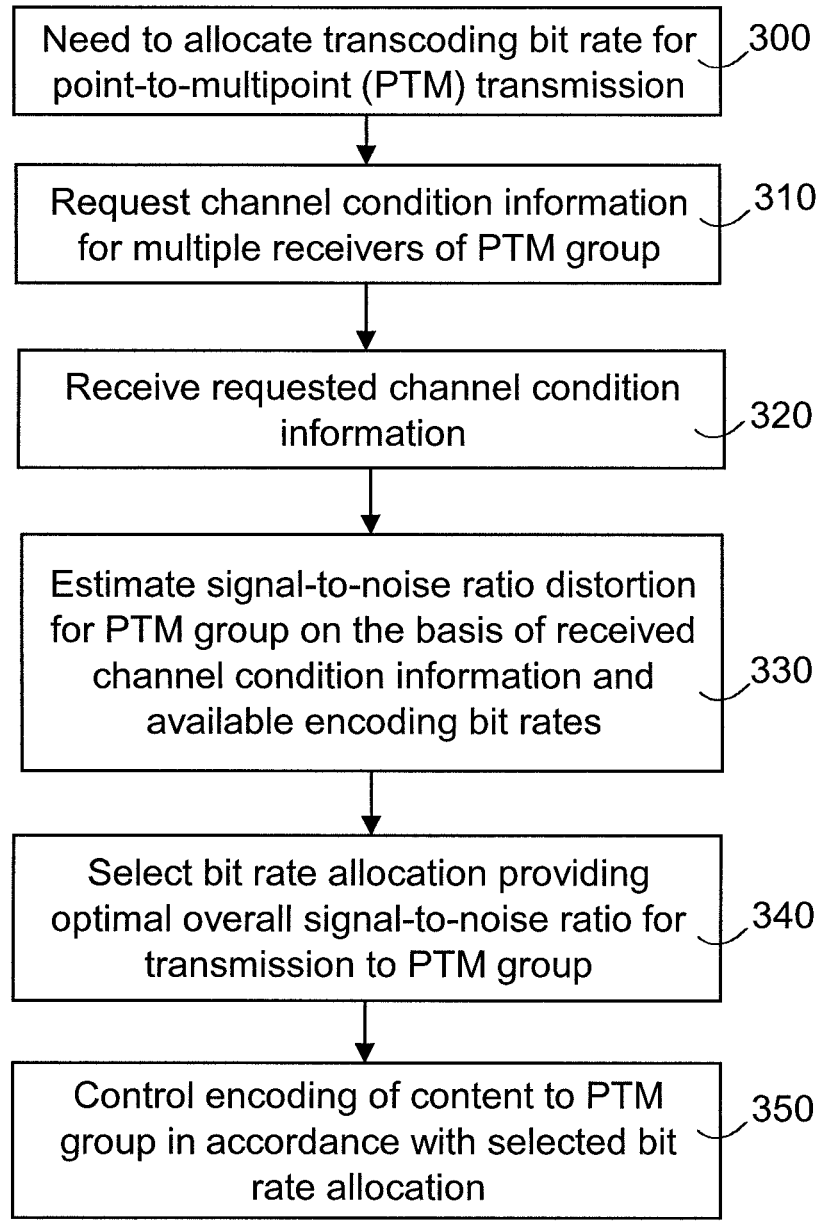
FIG. 3 illustrates a method according to an embodiment.

FIG. 3 illustrates a method according to an embodiment. In step 300 there is a need to select a bit rate allocation for a PTM transmission, such as an IP multicast. This step may be entered at the PTM session initialization stage, in response to detecting a specific event, or dynamically at given intervals during the runtime, for instance.

Channel condition information is requested 310 for multiple receivers belonging to the PTM group. This information may be requested for all or only some of the receivers of the PTM group. This information may be requested from PTM receiver terminal devices or a network entity already having such information. This information may be acquired upon request by performing channel measurement procedures between a transcoder and each receiver of the PTM group. Channel condition information of the receivers of the PTM group is received 320.

A signal-to-noise ratio distortion is estimated 330 for the PTM group on the basis of the received channel condition information and available encoding bit rates. The information on the available bit rates may be requested and received from a transcoder, or may be readily available in the apparatus 200 performing the method of FIG. 3.

In one embodiment the estimation generation 330 is arranged by calculating the signal-to-noise ratio distortion estimation for each combination of the available encoding bit rates, to enable determining an optimal bit rate for PTM transmission to the PTM group.

A bit rate allocation providing an optimal overall signal-to-noise ratio for transmission to the PTM group is selected 340 on the basis of the generated signal-to-noise ratio estimation. In one embodiment the selection step 340 selects encoding bit rates that minimize the total multimedia distortion of the group of receivers. It is to be noted that although overall SNR for the group is being optimized, SNR may be calculated only for part of the group subscribers.

The encoding of content to the PTM group is controlled 350 in accordance with the selected bit rate allocation. In one embodiment a transcoder receiving content from a content source is controlled to encode the content in accordance with the selected bit rate detected as being the most appropriate for the current network conditions of the entire PTM group. In the following disclosure further embodiments are illustrated for multicast transmission.

According to an embodiment, the channel condition information comprises a first descriptor indicating the available bandwidth and a second descriptor indicating the packet loss rate. Hence, the currently available bandwidth and packet loss rate may be obtained in steps 310 and 320.

In some cases, the PTM group receivers or the apparatus 200 performing the method of FIG. 3 may know the channel condition information beforehand so they can directly reply upon request 310. However, in many cases, the network is so dynamic that the two parties have to cooperate to perform channel measurements to acquire reliable information on the channel condition parameters. This may involve several rounds of message exchange between the receivers and the apparatus 200.

Packet-pair probing and loss-delay based algorithms are examples of techniques which may be applied for obtaining the bandwidth and packet loss rate information. As regards further information on packet-pair probing, reference is made to "*Estimating Available Bandwidth Using Packet Pair Probing*", Ningning Hu, Peter Steenkiste, Sep. 9, 2002, CMU-CS-02-166, available at www.cs.cmu.edu/~hnn/papers/igi-tr.pdf. As regards further information on loss-delay, reference is made to "*The Loss-Delay Based Adjustment Algorithm: A TCP-Friendly Adaptation Scheme*", Dorgham Sisalem, Henning Schulzrinne, available at http://www.cs.columbia.edu/~hgs/papers/Sisa9807_Loss.pdf.

According to an embodiment, an estimation of overall peak signal-to-noise ratio distortion of a multicast group is calculated, and encoding bit rates minimizing the overall peak signal-to-noise ratio (PSNR) distortion of the multicast group are selected. Let us now study this embodiment in more detail.

Due to its popularity, the following embodiment applies a double description coding (DDC) scheme, in which a video stream is divided into two descriptions, and each description is further encoded into a base layer and an enhancement layer, which may have different quality of service (QoS) management levels. However, the application of the present features is not limited to any particular coding scheme, and other multiple description coding (MDC) schemes may also be applied.

Further, to simplify the discussion below, it is assumed that content data of different layers are equally protected against an error-prone transmission channel. It is also assumed that at least one channel measurement mechanism, such as a packet-pair based algorithm or loss-delay based heuristics, is available in the system for the present purpose. However, the present features are not limited to applying these mechanisms.

For a subscriber s in a set S, let B denote the measured available bandwidth. Further, let P denote the packet loss rate of a layer.

$P_i = (0,1]$, $i \in \{1,2,3,4\}$, and $P_i' = X_i^j \cdot P_i$, $\{i,j\} \in \{1,2,3,4\}$, where $X_i^j$ is a binary variable that is set to 1 if a recipient or subscriber j is willing to accept layer i (due to playback capacity limitations, for instance), otherwise $X_i^j=0$.

The probability of successful reception of each layer can then be presented as follows:

$$\begin{cases} p_{00}^b = (1-P_1')(1-P_3') \\ p_{01}^b = (1-P_1') \cdot P_3' \\ p_{10}^b = P_1' \cdot (1-P_3') \\ p_{11}^b = P_1' \cdot P_3' \end{cases} \begin{cases} p_{00}^e = (1-P_2')(1-P_4') \\ p_{01}^e = (1-P_2') \cdot P_4' \\ p_{10}^e = P_2' \cdot (1-P_4') \\ p_{11}^e = P_2' \cdot P_4' \end{cases} \quad (1)$$

p's superscripts b and e denote the base layer and enhancement layer respectively, and its subscripts denote whether or not a layer is successfully received. For example, $p_{01}^b$ means the base layer of the first description is correctly received, but the base layer of the second description is not.

On the basis of this, for the subscriber s in subscriber set S, PSNR can be measured by distortion caused by the packet loss:

$$D_s = \sum_i p_i \cdot d_i, \text{ where } i \in \{00, 01, 10, 11\}. \quad (2)$$

For example, the subscriber s agrees to receive both layers of the first description and the base layer of the second description, which results in $X^s=\{1,1,1,0\}$, so:

$$d_3 = p_{00}^b [p_{01}^e d_{00}(R_{1b}+R_{1e}, R_{2b}) + p_{11}^e d_{00}(R_{1b}, R_{2b})] + \quad (3)$$
$$p_{01}^b [p_{01}^e d_{01}(R_{1b}+R_{1e}) + p_{11}^e d_{01}(R_{1b})] + p_{10}^b d_{10}(R_{2b}) + p_{11}^b d_{11}$$

where distortion d(.) is a function of bit rates of descriptions.

In one embodiment, the distortion d(.) follows the rate-distortion model proposed in M. Alasti, K. Sayrafian-Pour, A. Ephremides, and N. Farvardin, "*Multiple description coding in networks with congestion problem*", IEEE Trans. on Information Theory, 47(3):891-902, March 2001, incorporated herein as a reference. Section III discusses the rate-distortion model.

Therefore, the problem is solved by minimizing overall PSNR D:

Problem 1:

$$\min D = \sum_s D_s. \quad (4)$$

subject to:

$$R_i \leq B_i^s, i \in \{00, 01, 10, 11\}, s \in S$$
$$\sum_i R_i = Z,$$

where Z denotes the bit rate of original multimedia content from a content source. There are two options to solve Problem 1. First, the solution R*=argmin D can be found by searching the solution space exhaustively, if R can only take a limited number of discrete values. Otherwise, the optimal solution must be found numerically. In practice, considering that codecs used by a transcoder for multicast transmission have only K available output bit rates, and K is usually small (for example, the widely adopted adaptive multi-rate AMR voice codec series has 8 choices of bit rates ranging from 12.2 kbps to 4.75 kbps), the first option should be applicable to most cases, resulting in a complexity of $o(K^n)$, which should be feasible for most practical cases, such as the DDC encoding (DDC has a total of 4 layers, so n=4).

In one embodiment, the present bit-allocation scheme is implemented near transcoders located on the transport plane of the network. In a further embodiment, a Media Resource Function (MRF) of 3GPP IP Multimedia Sub-system (IMS) is arranged to perform at least some of the present features.

Figure 4:
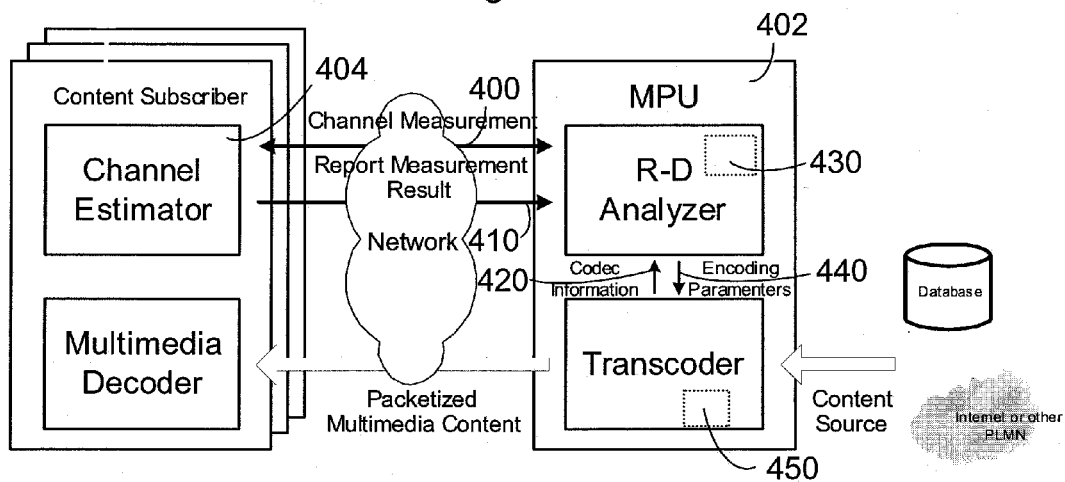
FIG. 4 illustrates signalling according to an embodiment.

FIG. 4 exemplifies a system with the above-illustrated embodiments. An R-D analyser is provided in a multimedia processing unit MPU 402, such as MRF of 3GPP IMS. The R-D analyser interacts 400 with a channel estimator 404 to derive two key channel descriptors: bandwidth B and packet loss rate P. The channel estimator delivers 410 the measurement result back to the R-D analyser, including the B and P.

The R-D analyser acquires 420 an available output bit rates set of a selected codec from a transcoder. The R-D analyser determines 430 an optimal bit rate allocation R* by solving Problem 1. The R-D analyser then delivers 440 the R* to the transcoder.

A selected codec in the transcoder configures 450 itself with R* and encodes multimedia content from a content source. The transcoder may then deliver the processed multimedia content from a content provider or database to subscribers over the network by multicasting.

In one embodiment for 3GPP IMS, the R-D analyser may reside in MRFC, whereas the transcoder is in Media Resource Function Processor MRFP. In this case, H.248 used on the Mp interface between MRFC and MRFP can be readily extended to support the messages necessary for the above illustrated features between the R-D analyzer and the transcoder. H.248 gateway control protocol is specified in IETF RFC 3525 "*Gateway Control Protocol Version 1*", C. Groves et al., June 2003.

However, it is to be noted that the control interface between a transcoder and the controller 250 of the apparatus 200 of FIG. 2, or the R-D analyser of FIG. 4, is not limited to any particular protocol, but current or future standardized or proprietary protocols may be applied.

The present features enable major advantages. First, by incorporating a distortion model as described, the present method and apparatus enable the prediction and overall optimization of (P)SNR of subscribers in a PTM group, resulting in an overall quality improvement of multimedia PTM. With the present features, it is possible to improve the overall video quality of a group of users; a typical case of multicast in which the transcoder must be able to encode a video stream to meet all group users of very different capacities.

The present functionality can be easily integrated to existing systems. The present functionality is independent of specific systems, thus it can be implemented in different networks that support PTM.

The steps, signaling messages and related functions described above are in no absolute chronological order, and some of the steps/points may be performed simultaneously or in an order differing from the given one. Other functions can also be executed between the steps or within the steps and other signaling messages sent between the illustrated messages. Some of the steps or part of the steps can also be left out or replaced by a corresponding step/point or part of the step.

For instance, in an alternative embodiment, the channel condition information is not separately requested (step 310), but such information may already be available for distortion estimation generation.

It will be obvious to a person skilled in the art that, as technology advances, the inventive concept can be implemented in various ways. The invention and its embodiments are not limited to the examples described above but may vary within the scope of the claims. The features of the embodiments described herein may be combined in all possible combinations of methods, apparatuses, modules, systems, and computer program products. The combinations of claim elements as stated in the claims can be changed in a number of different ways and still be within the scope of various embodiments of the invention.

The invention claimed is:

1. A method for controlling point-to-multipoint communications, comprising:
   providing a bit rate distortion analyzer disposed in a multimedia processing unit;
   receiving channel condition information for multiple receivers of a point-to-multipoint group,
   estimating signal-to-noise ratio distortion for the point-to-multipoint group on the basis of the received channel condition information and available encoding bit rates,
   selecting a bit rate allocation out of the available encoding bit rates providing an optimal overall signal-to-noise ratio for transmission to the point-to-multipoint group, and
   controlling encoding of content to the point-to-multipoint group in accordance with the selected bit rate allocation,
   wherein the selected bit rate allocation providing the optimal overall signal-to-noise ratio is based on the estimated signal-to-noise ratio distortion, and
   wherein the channel condition information comprises a first descriptor indicating available bandwidth and a second descriptor indicating packet loss rate, where the first and the second descriptors are derived from the bit rate distortion analyzer based on the estimated signal-to-noise ratio distortion.

2. The method of claim 1, the step of selecting the overall optimal signal-to-noise ratio comprising selection of encoding bit rates that minimize the total distortion of the multiple receivers of the point-to-multipoint group.

3. The method of claim 1, wherein multiple description coding with layered encoding of multimedia content is applied, each layer being allocated with a bit rate, whereby an overall signal-to-noise ratio distortion of the point-to-multipoint group is estimated by calculating a signal-to-noise ratio distortion estimation for each combination of the available encoding bit rates, and
   an encoding bit rate minimizing the overall signal-to-noise ratio distortion of the point-to-multipoint group is selected.

4. The method of claim 1, wherein the method is applied in a broadcast/multicast service center configured to provide multimedia broadcast/multicast service for a plurality of user equipment of the point-to-multipoint group.

5. An apparatus comprising: a processor and a memory, the apparatus configured to control the processor to perform operations, comprising:
   analyzing a bit rate distortion;
   receiving channel condition information for multiple receivers of a point-to-multipoint group,
   estimating signal-to-noise ratio distortion for the point-to-multipoint group on the basis of the received channel condition information and available encoding bit rates,
   selecting a bit rate allocation out of the available encoding bit rates providing an optimal overall signal-to-noise ratio for transmission to the point-to-multipoint group, and
   controlling encoding of content to the point-to-multipoint group in accordance with the selected bit rate allocation,
   wherein the selected bit rate allocation providing the optimal overall signal-to-noise ratio is based on the estimated signal-to-noise ratio distortion, and
   wherein the channel condition information comprises a first descriptor indicating available bandwidth and a second descriptor indicating packet loss rate, where the first and the second descriptors are derived from the means for analyzing the bit rate distortion based on the estimated signal-to-noise ratio distortion.

6. The apparatus of claim 5, wherein the apparatus is a multimedia processing unit configured to:
   request channel condition information by a multimedia processing unit from each of the multiple receivers of the point-to-multipoint group,
   receive measurements of the channel conditions,
   request available output bit rates of a selected codec,
   receive the available output bit rates, and estimate the signal-to-noise ratio distortion for the point-to-multipoint group on the basis of the received measurements and the received output bit rates.

7. The apparatus of claim 5, wherein the apparatus is configured to select the encoding bit rates that minimize total distortion of the multiple receivers of the point-to-multipoint group.

8. The apparatus of claim 5, wherein the apparatus is configured to apply multiple description coding with layered encoding of multimedia content, each layer being allocated with a bit rate,
   the apparatus is configured to estimate an overall signal-to-noise ratio distortion of the point-to-multipoint group by calculating a signal-to-noise ratio distortion estimation for each combination of the available encoding bit rates, and
   the apparatus is configured to select an encoding bit rate minimizing the overall signal-to-noise ratio distortion of the point-to-multipoint group.

9. The apparatus of claim 5, wherein the apparatus is a broadcast/multicast service center and/or a media resource function controller.

10. A computer program product comprising a non-transitory computer readable-medium encoded with program instructions which, when executed in a processor of an apparatus, constitute the steps of claim 1.

11. A system comprising a point-to-multipoint service node and a bearer network for transmitting multimedia content as point-to-multipoint service to a plurality of point-to-multipoint service receivers, wherein the system comprises an apparatus of claim 5.

12. A method for controlling point-to-multipoint communications, comprising:
   receiving channel condition information for multiple receivers of a point-to-multipoint group,
   estimating signal-to-noise ratio distortion for the point-to-multipoint group on the basis of the received channel condition information and available encoding bit rates,
   selecting a bit rate allocation out of the available encoding bit rates providing an optimal overall signal-to-noise ratio for transmission to the point-to-multipoint group, and
   controlling encoding of content to the point-to-multipoint group in accordance with the selected bit rate allocation, wherein multiple description coding with layered encoding of multimedia content is applied, each layer being allocated with a bit rate, whereby an overall signal-to-noise ratio distortion of the point-to-multipoint group is estimated by calculating a signal-to-noise ratio distortion estimation for each combination of the available encoding bit rates, an encoding bit rate minimizing the overall signal-to-noise ratio distortion of the point-to-multipoint group is selected, and wherein the encoding bit rate minimizing the overall signal-to-noise ratio distortion is obtained by solving the following problem:

$$\min D = \sum_s D_s,$$

subject to: $R_{i \leq Bi}{}^s$, $i \in \{00,01,10,11\}$ $$s \in S, \quad \sum_i R_i = Z,$$

wherein $$D_s = \sum_i p_i \cdot d_i,$$

where $i \in \{00,01,10,11\}$,
wherein
R represents bit rate,
B represents bandwidth,
s represents a subscriber,
S represents a subscriber set, Z represents the bit rate of original multimedia content from a content source,
$p_i$ represents probability of successful reception, and
$d_i$ represents distortion of layers of dual description coding descriptions, calculated as a function of bit rates of descriptions.

13. An apparatus comprising: a processor and a memory, the apparatus configured to control the processor to perform operations, comprising:

receiving channel condition information for multiple receivers of a point-to-multipoint group, estimating signal-to-noise ratio distortion for the point-to-multipoint group on the basis of the received channel condition information and available encoding bit rates, selecting a bit rate allocation out of the available encoding bit rates providing an optimal overall signal-to-noise ratio for transmission to the point-to-multipoint group, and controlling encoding of content to the point-to-multipoint group in accordance with the selected bit rate allocation, wherein the apparatus is configured to apply multiple description coding with layered encoding of multimedia content, each layer being allocated with a bit rate, the apparatus is configured to estimate an overall signal-to-noise ratio distortion of the point-to-multipoint group by calculating a signal-to-noise ratio distortion estimation for each combination of the available encoding bit rates, the apparatus is configured to select an encoding bit rate minimizing the overall signal-to-noise ratio distortion of the point-to-multipoint group, and wherein the apparatus is configured to obtain the encoding bit rate minimizing the overall signal-to-noise ratio distortion by solving the following problem:

$$\min D = \sum_s D_s,$$

subject to: $R_i \leq B_i{}^s$, $i \in \{00,01,10,11\}$ $$s \in S, \quad \sum_i R_i = Z,$$

wherein $$D_s = \sum_i p_i \cdot d_i,$$

where $i \in \{00,01,10,11\}$,
wherein
R represents bit rate,
B represents bandwidth,
s represents a subscriber,
S represents a subscriber set,
Z represents the bit rate of original multimedia content from a content source,
$p_i$ represents probability of successful reception, and
$d_i$ represents distortion of layers of dual description coding descriptions, calculated as a function of bit rates of descriptions.

* * * * *